(12) United States Patent
McConnell et al.

(10) Patent No.: US 6,961,019 B1
(45) Date of Patent: Nov. 1, 2005

(54) METHOD AND APPARATUS FOR REDUCING GPS RECEIVER JAMMING DURING TRANSMISSION IN A WIRELESS RECEIVER

(75) Inventors: Richard Joseph McConnell, Rancho Cucamonga, CA (US); Robert Tso, South San Gabriel, CA (US)

(73) Assignee: Sirf Technology, Inc., San Jose, CA (US)

( * ) Notice: Subject to any disclaimer, the term of this patent is extended or adjusted under 35 U.S.C. 154(b) by 0 days.

(21) Appl. No.: 09/920,898

(22) Filed: Aug. 2, 2001

Related U.S. Application Data

(60) Provisional application No. 60/224,741, filed on Aug. 10, 2000.

(51) Int. Cl.[7] ............................. G01S 5/14; H04B 1/10; H04B 1/44
(52) U.S. Cl. ....................... 342/357.1; 455/78; 455/295
(58) Field of Search ......................... 342/357.09, 357.1; 455/79, 82, 174.1, 194.1, 223, 295, 296, 271, 78; 375/217

(56) References Cited

U.S. PATENT DOCUMENTS

| | | | | |
|---|---|---|---|---|
| 6,107,960 A | * | 8/2000 | Krasner | 342/357.09 |
| 6,442,375 B1 | * | 8/2002 | Parmentier | 455/78 |
| 6,466,163 B2 | * | 10/2002 | Naruse et al. | 342/357.1 |
| 2003/0122706 A1 | * | 7/2003 | Choi et al. | 342/357.1 |

* cited by examiner

*Primary Examiner*—Gregory C. Issing

(57) ABSTRACT

A method and apparatus for minimizing the interference between wireless transmissions and a proximately located or co-located GPS receiver is disclosed. By feedforward of a phase and amplitude adjusted version of the transmitted signal and combining said signal with the composite signal at the input of the GPS receiver, the GPS receiver sensitivity degradation is reduced or eliminated in the case of perfect cancellation, and the GPS receiver is not jammed by the wireless transmissions. The invention allows a single antenna to be implemented for GPS reception and wireless transmission and reception without unduly complicating the diplexing/filtering network required to separate the multiple signals being transmitted and/or received by the single antenna.

20 Claims, 3 Drawing Sheets

METHOD AND APPARATUS FOR REDUCING GPS RECEIVER JAMMING DURING TRANSMISSION IN A WIRELESS RECEIVER

CROSS-REFERENCE TO RELATED APPLICATIONS

This application claims priority under 35 U.S.C. § 119(e) of U.S. Provisional Patent Application No. 60/224,741, filed Aug. 10, 2000, entitled "METHOD AND APPARATUS FOR REDUCING GPS RECEIVER JAMMING DURING TRANSMISSION IN A WIRELESS TRANSCEIVER," by Richard J. McConnell, et al., which application is incorporated by reference herein.

BACKGROUND OF THE INVENTION

1. Field of the Invention

The present invention relates in general to wireless transceivers integrated with a Global Positioning System (GPS) receiver, and in particular to a method and apparatus for reducing GPS receiver jamming during transmission by the wireless transceiver.

2. Description of the Related Art

Wireless communications systems, including cellular telephony, Personal Communication System (PCS) devices, Personal Data Assistants (PDAs), and other wireless handsets and devices, has become commonplace. The use of such devices to provide voice, data, and other services, such as internet access, has provided many conveniences to wireless system users.

Currently, designers are integrating Global Positioning System (GPS) technology into wireless devices and other wireless transceivers. The GPS system transmits at 1.575 GHz, and the cellular and PCS systems transmit at 900 MHz and 1.9 GHz, respectively. Inherent in a device that combines GPS reception and wireless transmission circuitry, which circuitry includes an antenna, undesired electromagnetic coupling between the transmitter of the wireless transceiver and the GPS receiver w,ill occur. Since cellular devices (handsets) are typically small in size, it is desirable to have a device that can share an antenna for use by both the GPS receiver and the wireless transceiver, if this is possible without deleterious performance effects on either system.

Since the cellular and PCS transmitted signals are extremely strong signals relative to the GPS received signals, and these strong signals or their harmonics can degrade the sensitivity of the GPS receiver during wireless transceiver transmission, unless filtering or other methods are employed to reject the interfering or jamming signal As such, the reliability and operation of GPS receivers that are used in conjunction with cellular handsets is degraded.

It can be seen, then, that there is a need in the art for a method of reducing the effects of wireless transmissions on proximate GPS receivers. It can also be seen that there is a need in the art for an apparatus that can reduce the effects of wireless transmissions on GPS receivers. It can also be seen that there is a need in the art for a method and apparatus that can allow GPS receivers and wireless transmitters to share a common antenna.

SUMMARY OF THE INVENTION

To minimize the limitations in the prior art, and to minimize other limitations that will become apparent upon reading and understanding the present specification, the present invention discloses a method and apparatus for minimizing the interference between wireless transmissions and the proximate or co-located GPS receiver. By feedforward of a phase and amplitude adjusted version of the transmitted signal and combining said signal with the composite signal at the input of the GPS receiver, the GPS receiver sensitivity degradation is reduced or eliminated in the case of perfect cancellation, and the GPS receiver is not jammed by the wireless transmissions. Further, a single antenna can be used for GPS reception and wireless transmission and reception without unduly complicating the diplexing/filtering network required to separate the multiple signals beings transmitted and/or received by the single antenna.

An apparatus in accordance with the present invention comprises a GPS receiver, an antenna, coupled to the GPS receiver, a transceiver, a second antenna, coupled to the transceiver, coupling means, and a phase and gain adjusting means. The coupling means obtains a replica signal from the transceiver, which is selectively phase and gain adjusted and then is provided to the the GPS receiver. The selectively phase and gain adjusted replica signal reduces interference between a transmitted signal from the transceiver and a signal received by the GPS receiver.

It is an object of the present invention to provide a method of reducing the effects of wireless transmissions on proximate GPS receivers. It is another object of the present invention to provide an apparatus that can reduce the effects of wireless transmissions on GPS receivers. It is a further object of the present invention to provide a method and apparatus that allows GPS receivers and wireless transceivers to share a common antenna.

BRIEF DESCRIPTION OF THE DRAWINGS

Referring now to the drawings in which like reference numbers represent corresponding parts throughout.

DETAILED DESCRIPTION OF THE DRAWINGS

Figure 1:
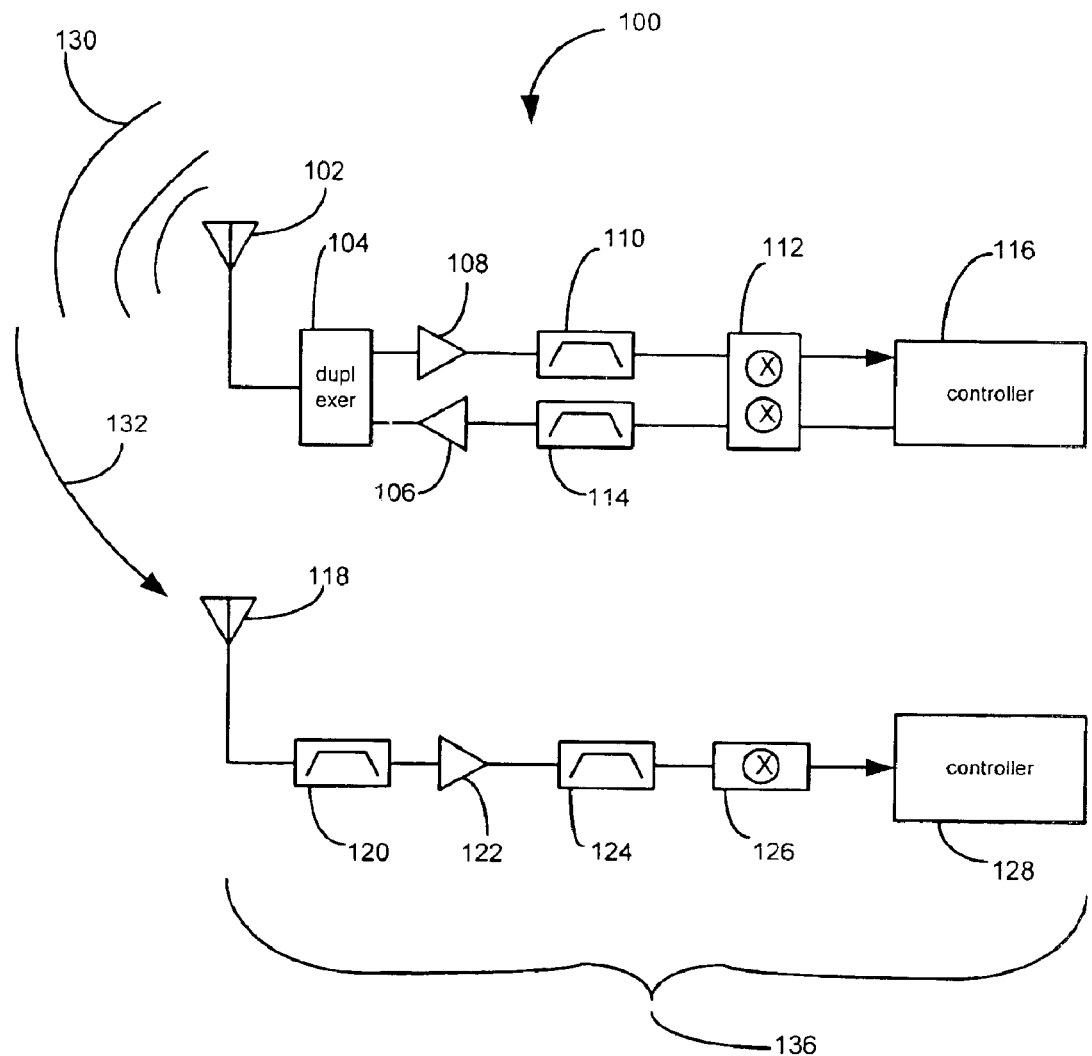
FIG. 1 illustrates the electromagnetic interference between the wireless and the GPS systems.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

It is a known problem that strong signals that fall within or near the GPS RF band will desensitize GPS receiver performance. Since cellular/PCS transmissions can introduce sputrious signals, or overdrive the GPS receiver, solving and/or minimizing the effects of such signals is of special interest for wireless handsets which contain a GPS receiver that must operate during a wireless transmission. Typically in such handsets, the wireless antenna and the GPS antenna are in close proximity or, preferably for low cost, are the same antenna, and the coupling of transmitted power is significant and likely to degrade GPS performance. The present invention describes a method of avoiding or greatly reducing the degree of GPS desensitization that occurs.

Although described herein with respect to cellular/PCS interference with GPS receivers, the interference phenomenon is present for any signals that are of a frequency near or within the GPS receiver band, as well as signals that have harmonics that fall near or within the GPS receiver band, or any signals that degrade the GPS receiver. The present invention is not limited to cellular and/or PCS applications, but can be used to reduce or eliminate the degradation of GPS receiver sensitivity in other wireless transceiver and GPS receiver applications and/or environments.

System Overview

The present invention provides a system solution that uses additional circuitry between the wireless transceiver and GPS receiver, and within the GPS RF front end circuits. A correction "replica" signal is obtained from the power-amplifier section of the wireless transceiver. The replica signal is then provided to the GPS receiver as an interference cancellation signal. The combined wireless transceiver and GPS receiver contains circuitry that allows digitally controlled adjustment of the amplitude and phase of the replica signal, such that when added with the composite signal received by the GPS front end, the net power of undesired wireless signal in said GPS circuit is moninmized or nulled.

The GPS front end circuitry includes a detector which provides the system a relative indication of the power level of the received wireless signal. This signal is digitized and the information is provided to a digital controller, which is typically integrated with the baseband processor. Effectively the system implements a cancellation feedback algorithm, and the immunity of the GPS receiver is achieved independent of the physical design of the handset, allowing great flexibility for the handset designer in selecting the degree of co-location of the GPS and wireless antennas, including the highly desirable case of using a single multi-band antenna. Furthermore, the method requires very little duty factor usage of the receiver's processor or controller. Further, the present invention is useful in handsets of different manufacturers, since the feedback technique of the present invention is usefull regardless of handset design.

Block Diagrams

FIG. 1 illustrates the electromagnetic interference between the cellular and the GPS systems. System 100 comprises a wireless transceiver antenna 102, which is coupled to a duplexer 104. Duplexer 104 allows the antenna 102 to be used alternatively or simultaneously by a transmitter amplifier (power amplifier (PA)) 106 and a receiver amplifier (Low Noise Amplifier (LNA)) 108. LNA 108 is coupled to a bandpass filter 110, which is coupled to a frequency converter 112. PA 106 is also coupled to a bandpass filter 114, which is coupled to the frequency converter 112. Frequency converter 112 is coupled to the IF, frequency synthesis and wireless baseband processor and controller 116.

System 100 also comprises a GPS antenna 118, which may be the same antenna as antenna 102, but, for ease of illustration of the problem to be solved by the present invention, is shown as a separate antenna 118. Antenna 118 is coupled to a pre-select Radio Freqency (RF) filter 120, which is coupled to an amplifier 122. The output of amplifier 122 is coupled to another bandpass filter 124, which is then input to frequency converter 126. The output of frequency converter 126 is delivered to a GPS processor and controller 128. GPS receiver 136 comprises antenna 118, filter 120, amplifier 122, filter 124, frequency converter 126, and controller 128.

When antenna 102 is transmitting signal 130, an interference signal 132 occurs when antenna 102 is transmitting wireless system voice data and/or digital or analog data. Since the interference signal 132 so strong and real filters have limited stop band capability, the GPS receiver 136 is desensitized by such a signal either by intermodulation mixing effects which occur within amplifier 122, or by GPS in band interference contained in signal 130.

Figure 2:
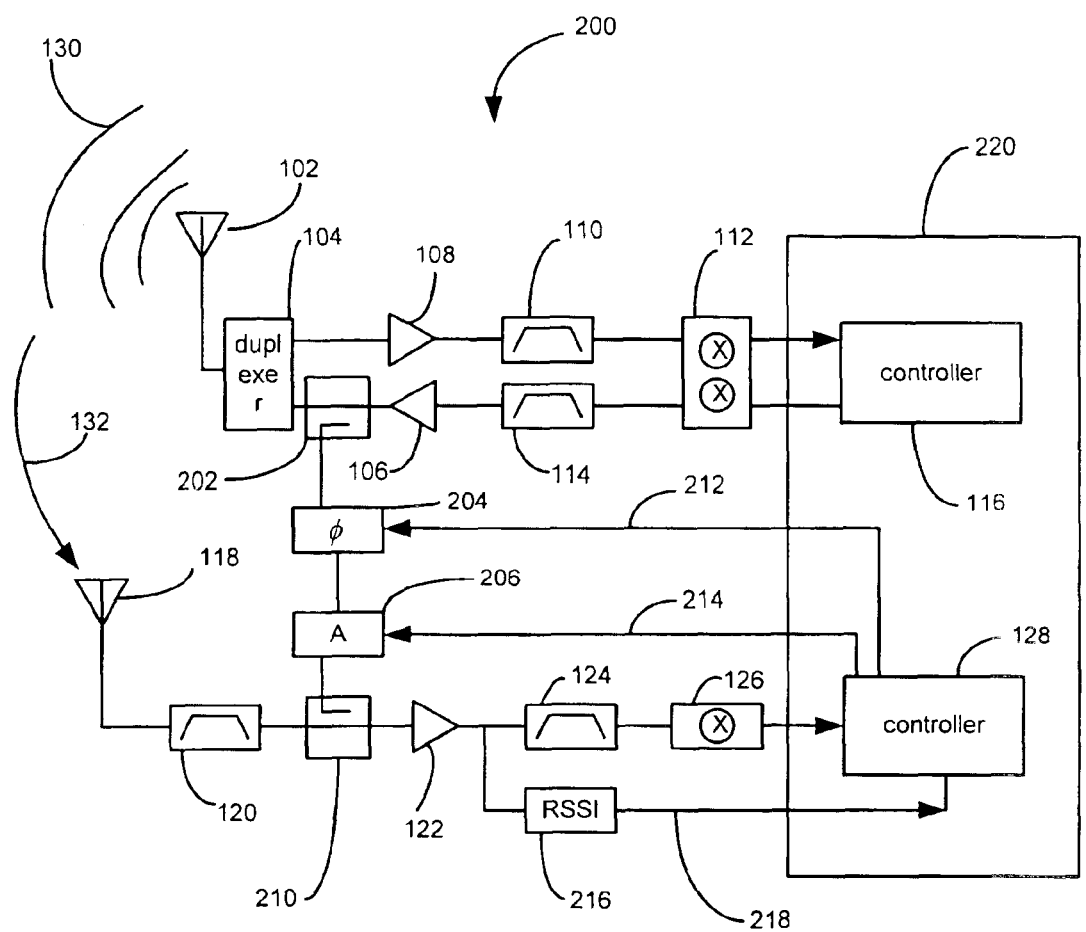
FIG. 2 illustrates a system in accordance with the present invention.

FIG. 2 illustrates a system in accordance with the present invention. System 200 is similar to system 100, but uses feedback to assist system 200 in canceling the interference signal 132 on GPS receiver 136.

Coupler 202 couples a replica version of the transmitted signal output of PA 106, and delivers the replica signal to blocks 204 and 206. Blocks 204 and 206 can control the phase and amplitude of the replica signal, and blocks 204 and 206 generate resulting signal 208. Coupler 210 then couples resulting signal 208 into the GPS amplifier 122 input.

The phase and amplitude of resulting signal 208 is adjusted by controller 128, which can alter the phase and amplitude of signal 208 via control signal paths 212 and 214 respectively. To determine how to control blocks 204 and 206 using controller 128, Receive Signal Strength Indicator (RSSI) 216 is coupled to the incoming received signal after the GPS amplifier 122, and the output of RSSI 216 is fed into controller 128. The output signal 218 of RSSI 216 is monitored by controller 128. The phase and amplitude of signal 208 are iteratively adjusted according to a minimization search routine, which can be programmed by software in the controller. By properly adjusting the phase and amplitude of signal 208 via controller 128 and blocks 204 and 206, the effects of interfering signal 132 can be reduced or eliminated.

In most designs, the interference signal 132 will be fixed in phase and amplitude once the wireless device is designed, and the only effects that blocks 204 and 206 will be requited to adaptively cancel are long-term drift effects generated in system 200, or changes of the signal 132 due to external environment changes which affect the coupling between antenna 102 and 118. As such, the added overhead burden of the invention upon controller 128 will cause insignificant power increase after initial setting of the phase and amplitude adjusters within blocks 204 and 206. Further, the feedback loop described in the present invention can be used with any handset design, because the feedback loop can control wide variations of the phase and amplitude of interfering signal 132.

If antennas 102 and 118 are a single antenna, filter 120 now filters out most of the transmit signal from transmit amplifier 108, but cannot do so perfectly, since real filters have non-infinite out-of-band rejection, and therefore some of the transmit signal will be received at the GPS receiver 136. The present invention allows the performance requirements of filter 120 to be relaxed, since the feedback loop created by blocks 204 and 206 allows those portions of the transmitted signal that do pass through filter 120 to be canceled out by signal 208. Further, the feedback loop can be closed using feedback directly from the GPS receiver 136 instead of through the RSSI 216 if desired. If desired, the baseband controller 116 and the GPS controller 128 can be combined into a single controller 220.

Process Chart

Figure 3:
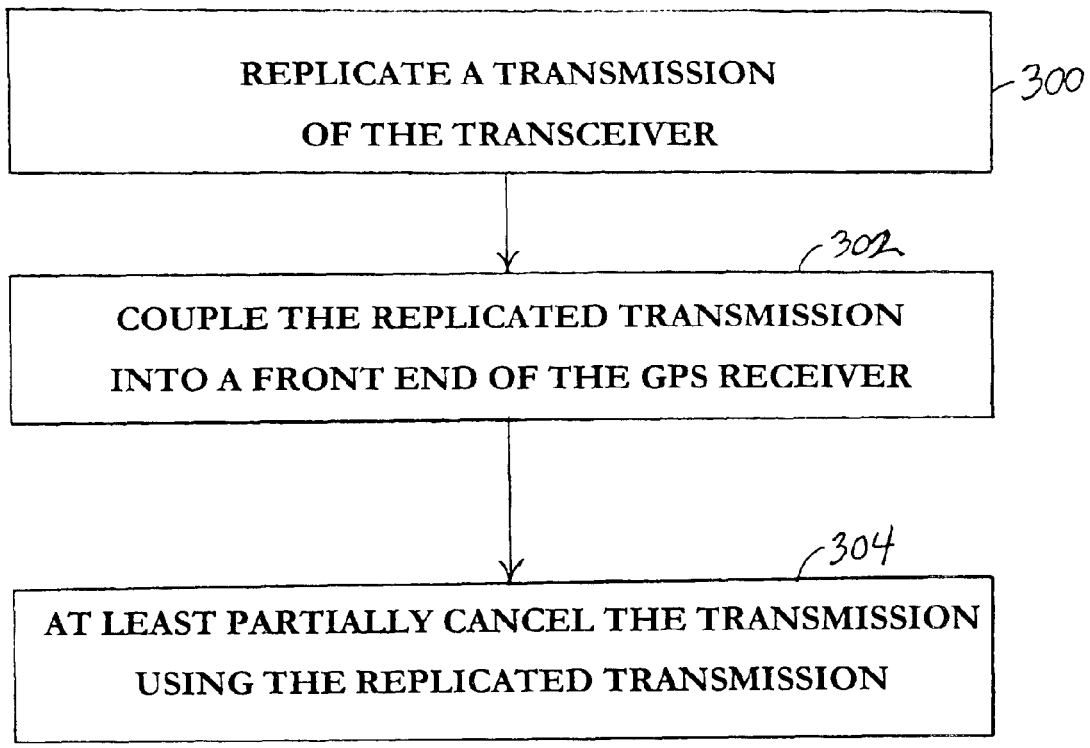
FIG. 3 is a flowchart illustrating the steps used to practice the present invention.

FIG. 3 is a flowchart illustrating the steps used to practice the present invention.

Block 300 illustrates replicating a transmission of the transceiver.

Block 302 illustrates coupling the replicated transmission into a front end of the GPS receiver.

Block 304 illustrates at least partially canceling the transmission using the replicated transmission.

Conclusion

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention. Further, although described with respect to a specific transceiver system, such as the cellular telephone system, other wireless or wire-based systems, such as Personal Data Assistants, mobile computers, Personal Communications Systems, wireless Local Area Networks (LANs), wireless LANs that are compatible with the "Bluetooth" standards, or other wireless or wire-based systems, can be used in place of or in conjunction with the cellular system herein described without departing from the scope of the present invention. Further, the present invention is usefull with transmitters as well as transceivers without departing from the scope of the present invention.

In summary, the present invention discloses a method and apparatus for reducing GPS receiver jamming during transmission in a wireless transceiver. An apparatus in accordance with the present invention comprises a GPS receiver, an antenna, coupled to the GPS receiver, a transceiver, a second antenna, coupled to the transceiver, coupling means, and a phase and gain adjusting means. The coupling means obtains a replica signal from the transceiver, which is selectively phase and gain adjusted and then is provided to the the GPS receiver. The selectively phase and gain adjusted replica signal reduces interference between a transmitted signal from the transceiver and a signal received by the GPS receiver.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A wireless mobile terminal system comprising:
   a GPS receiver;
   a first antenna, coupled to the GPS receiver, for allowing the GPS receiver to receive GPS signals transmitted from at least one GPS satellite;
   a wireless transceiver;
   a second antenna, coupled to the transceiver, for allowing the transceiver to transmit signals and further for allowing the transceiver to receive signals;
   a first coupling means, coupled to the transceiver, for obtaining a replica signal from the transceiver, the replica signal being a replica of a signal being transmitted by the transceiver;
   a phase and gain adjusting means, with an input coupled to the first coupling means, for accepting and selectively conditioning the replica signal; and
   a second coupling means, coupled to the output of the phase and gain adjusting means, for providing the selectively phase and gain adjusted replica signal to the GPS receiver, wherein the selectively phase and gain adjusted replica signal reduces interference between a transmitted signal from the transceiver and a signal received by the GPS receiver.

2. The system of claim 1, wherein the first antenna and the second antenna comprise a single antenna.

3. The system of claim 1, wherein the phase and gain adjusting means uses a feedback loop to reduce the interference between the transmitted signal from the transceiver and the signal received by the GPS receiver.

4. The system of claim 3, wherein the feedback loop comprises a received signal strength indicator for controlling adjustment of the phase and gain of the replica signal.

5. The system of claim 3, wherein the feedback loop further comprises an adaptive circuit.

6. The system of claim 5, wherein the adaptive circuit minimizes long-term drift effects.

7. A method for reducing interference in a Global Positioning System (GPS) receiver that shares an antenna with a transceiver, comprising the steps of:
   replicating a first transmission of the transceiver, wherein the first transmission of the transceiver emanates from the shared antenna;
   coupling the replicated transmission into a front end of the GPS receiver; and
   at least partially canceling a GPS signal received by the GPS receiver using the replicated transmission.

8. The method of claim 7, wherein the at least partial cancellation is performed using a feedback loop.

9. The method of claim 7, further comprising phase shifting the replicated transmission.

10. The method of claim 9, further comprising amplitude shifting the replicated transmission.

11. The method of claim 10, further comprising controlling the phase shifting of the replicated transmission and the amplitude shifting of the replicated transmission by using a received signal strength indicator.

12. The method of claim 7, further comprising minimizing long-term drift effects.

13. The method of claim 12, wherein the minimizing of long-term drift effects is performed by an adaptive circuit.

14. The method of claim 7 comprising amplitude shifting the replicated transmission.

15. A wireless communication system comprising:
   (a) a wireless transceiver for receiving and transmitting communication signals;
   (b) a GPS receiver for receiving GPS signals; and
   (c) a feedback circuit for receiving a replica signal from the transceiver, the replica signal being a replica of a signal transmitted by the transceiver, for conditioning the replica signal, and for providing the conditioned replica signal to the GPS receiver as an interference cancellation signal.

16. The system of claim 15 wherein the feedback circuit comprises a gain adjusting component for adjusting the gain of the replica signal.

17. The system of claim 16 wherein the feedback circuit comprises a phase adjusting component for adjusting the phase of the replica signal.

18. The system of claim 17 wherein the feedback circuit comprises a receive signal strength indicator for controlling the gain adjusting component and the phase adjusting component.

19. The system of claim 15 wherein the feedback circuit comprises a phase adjusting component for adjusting the phase of the replica signal.

20. The system of claim 15 wherein the feedback circuit comprises a receive signal strength indicator for conditioning the replica signal.

* * * * *